United States Patent [19]

Schaeffer

[11] Patent Number: 4,692,684

[45] Date of Patent: Sep. 8, 1987

[54] HIGH/LOW DC VOLTAGE MOTOR VEHICLE ELECTRICAL SYSTEM

[75] Inventor: Eric S. Schaeffer, Dearborn, Mich.

[73] Assignee: General Motors Corporation, Detroit, Mich.

[21] Appl. No.: 908,219

[22] Filed: Sep. 17, 1986

[51] Int. Cl.[4] .......................... H03J 7/14; B60L 1/02
[52] U.S. Cl. ..................................... 322/90; 219/202; 307/16; 320/64
[58] Field of Search ................ 322/7, 8, 28, 90; 219/202, 203; 320/64; 307/16

[56] References Cited

U.S. PATENT DOCUMENTS

| | | | |
|---|---|---|---|
| 3,316,416 | 1/1963 | Carlson | 307/17 |
| 3,469,072 | 9/1969 | Carlson | 219/202 |
| 3,634,750 | 1/1972 | Bobo | 322/20 |
| 3,962,621 | 8/1976 | Raver | 320/15 |
| 3,984,755 | 10/1976 | Lehnhoff et al. | 322/28 |
| 4,044,293 | 8/1977 | Follmer | 320/15 |
| 4,045,718 | 8/1977 | Gray | 320/17 |
| 4,084,126 | 4/1978 | Clements | 219/202 X |
| 4,117,390 | 9/1978 | Iwata | 322/90 |
| 4,179,647 | 12/1979 | Cummins et al. | 320/6 |
| 4,214,198 | 7/1980 | Schneider | 320/15 |
| 4,262,242 | 4/1981 | Glennon | 322/28 |
| 4,263,543 | 4/1981 | Watrous et al. | 219/202 X |
| 4,267,433 | 5/1981 | Sahm, III | 322/8 X |
| 4,286,205 | 8/1981 | Watrous | 322/8 |
| 4,581,572 | 4/1986 | Yoshiyuki et al. | 322/86 |

*Primary Examiner*—R. J. Hickey
*Attorney, Agent, or Firm*—Tim G. Jaeger

[57] ABSTRACT

An automotive electrical system with a generator has outputs for loads requiring a high and low voltage, e.g., a heater and a battery. A field-controlled a.c. generator with three-phase output windings has a low voltage main terminal and an auxiliary terminal for high voltage loads. A step-down transformer and a first rectifier connect the windings and the main terminal while a second rectifieer directly connects the windings and the auxiliary terminal. A selector switch having a open and closed positions is connected between the main terminal and the auxiliary terminal. A voltage regulator for controlling current through the generator field is connected to the main terminal. When the selector switch is open the generator provides a dual voltage output i.e., a high voltage level at the auxiliary terminal and a low voltage level at the main terminal; in the closed position of the switch the regulator is connected to the auxiliary terminal and reduces the generator output thereof to said low voltage level while the output of the first rectifier is reduced to an ineffective level, due to the step-down effect of the transformer. The selector switch thus controls the generator output between a dual voltage output (switch open) and a low voltage output (switch closed).

4 Claims, 2 Drawing Figures

HIGH/LOW DC VOLTAGE MOTOR VEHICLE ELECTRICAL SYSTEM

This invention relates to an electrical system for an automotive vehicle which provides not only the usual low-magnitude DC voltage for energizing the ordinary low DC voltage loads of the vehicle, but which also provides a high-magnitude DC voltage capable of energizing a high DC voltage auxiliary load.

The common motor vehicle electrical system includes a storage battery, a three-phase AC generator, a three-phase full-wave rectifier, and a voltage regulator. The battery provides standby power at a DC voltage of predetermined low magnitude (e.g., a nominal fourteen volts) between a main power terminal and system ground. The engine driven generator typically includes output windings across which a three-phase AC voltage is produced at an amplitude determined by the amount of current fed through a field winding. The rectifier acts to convert the three-phase AC voltage to a DC voltage between the main power terminal and system ground for charging the battery and for supplying the other low-magnitude DC voltage vehicle loads. The voltage regulator is responsive to the DC voltage appearing between the main power terminal and system ground to control the amount of current fed through the field winding of the generator so as to cause the three-phase AC voltage put out by the output windings of the generator to have an amplitude correct to establish and maintain the DC voltage at the predetermined low magnitude.

In a motor vehicle electrical system of the above common type, it is sometimes necessary or desirable to provide electrical power to an auxiliary load requiring energization from a DC voltage of substantially greater magnitude (e.g., 50 to 75 volts) than the low-magnitude DC voltage ordinarily provided in such system. A high-power windshield heater element is one example of such a high DC voltage auxiliary load. The present invention provides a high-magnitude DC voltage power supply applicable to a motor vehicle electrical system of the above-described type and capable of advantageously energizing a high DC voltage load such as a high-power window glass heater.

According to the invention, the foregoing common low-magnitude DC voltage automotive electrical system is modified by the addition of three elements: a three-phase AC voltage step-down transformer connected between the output of the engine driven three-phase generator and the input of the three-phase full-wave rectifier, a second three-phase full-wave rectifier connected between the output of the three-phase generator and an auxiliary power terminal, and a selector switch connected between the auxiliary power terminal and the main power terminal. In operation, when the switch is closed, the first rectifier is disabled and the three-phase AC voltage put out by the generator (as controlled by the voltage regulator) has a first amplitude correct when rectified by the second rectifier to establish and maintain the DC voltage between the main power terminal and system ground at the predetermined low magnitude. Conversely, when the switch is opened, the first rectifier is enabled and the three-phase AC voltage put out by the generator (as controlled by the voltage regulator) has a second higher amplitude correct when stepped down by the transformer and rectified by the first rectifier to establish and maintain the DC voltage between the main power terminal and system ground at the predetermined low magnitude. Additionally, with the switch opened, the second higher amplitude of the three-phase AC voltage put out by the generator is also correct when rectified by the second rectifier to establish and maintain a DC voltage between the auxiliary power terminal and system ground which is higher than the predetermined low-magnitude DC voltage by a voltage step-up ratio which is the converse of the voltage step-down ratio of the transformer. The latter high-magnitude DC voltage may be applied to energize a high DC voltage accessory load such as a high-power windshield heater.

In another aspect of the invention, where the voltage regulator is of the type in which the DC voltage for supplying the field winding of the generator is derived from a separate rectifier, three further elements are provided: a second switch operable in unison with the selector switch, and third and fourth rectifiers. The third rectifier is connected from the output of the three-phase generator through the second switch to a field winding supply terminal for rectifying the three-phase AC voltage put out by the generator to provide a DC voltage of approximately the predetermined low magnitude for energizing the field winding when the second switch is closed. The fourth rectifier is connected between the output of the three-phase transformer and the field winding supply terminal for rectifying the stepped-down three-phase AC voltage put out by the transformer to provide a DC voltage of approximately the predetermined low magnitude for energizing the field winding when the second switch is opened. In this manner, the field winding of the generator is always energized by a DC voltage of approximately the predetermined low magnitude regardless of the state of the selector switch and the amplitude of the three-phase AC voltage put out by the generator.

The foregoing and other aspects, features and advantages of the invention may be better understood by reference to the following detailed description of the preferred embodiments when taken in conjunction with the accompanying drawings in which.

Figure 1:
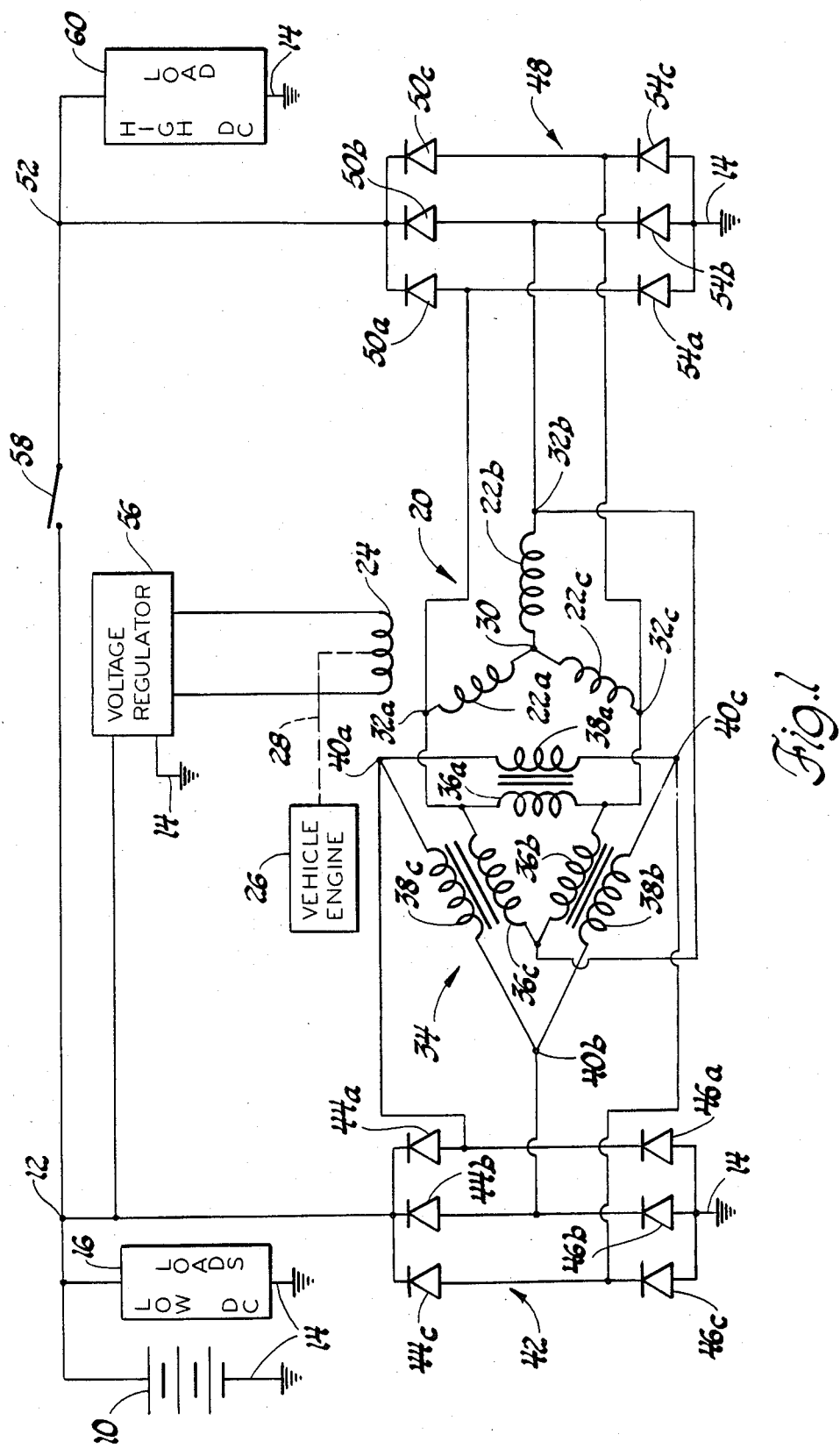
FIG. 1 is a schematic diagram of one embodiment of the invention.

Referring to FIG. 1 of the drawing, a motor vehicle electrical system includes a storage battery 10 connected between a main power terminal 12 and system ground 14 for providing standby power at a DC voltage of predetermined low magnitude, e.g., a nominal 14 volts. Also connected between the main power terminal 12 and system ground 14, as represented by block 16, are various low-magnitude DC voltage loads of the type normally found in a motor vehicle. It will be understood that each of the loads 16 may include appropriate switches and like devices for controlling the application of the low-magnitude DC voltage to energize such load.

A three-phase AC generator 20 includes output windings 22a, 22b and 22c and a field winding 24. Preferably, the generator 20 is of the type where the phase windings 22a, 22b and 22c are stationary and the field winding 24 is mechanically driven in rotation by the vehicle engine 26 through an approximate drive linkage 28. In operation, a three-phase AC voltage is developed across the output windings 22a, 22b and 22c having an amplitude determined by the amount of current fed through the field winding 24 and having a frequency determined by the rotating speed of the field winding 24.

The generator output windings 22a, 22b and 22c are arranged in a wye or star configuration in which each is connected between a common neutral node 30 and a different associated one of a set of generator output terminals 32a, 32b and 32c. As will be appreciated by those skilled in the art, the line-to-line phase voltage components of the three-phase AC voltage produced by the generator 20 appear between the respective output terminals 32a, 32b and 32c. Alternatively, the generator output windings 22a, 22b and 22c could be connected in a delta configuration if desired.

A three-phase voltage step-down transformer 34 includes a set of primary windings 36a, 36b and 36c, and a corresponding set of secondary windings 38a, 38b and 38c. The transformer primary windings 36a, 36b and 36c are each connected between different associated pairs of the generator output terminals 32a, 32b and 32c. The transformer secondary windings 38a, 38b and 38c are each connected between different associated pairs of transformer output terminals 40a, 40b and 40c. In operation, the transformer 34 is effective to step down the amplitude of the three-phase AC voltage put out by the generator 20 in accordance with a predetermined voltage step-down ratio, e.g., 4 to 1. Alternatively, the transformer 34 could be an autotransformer.

A first three-phase full-wave bridge rectifier 42 includes positively poled diodes 44a, 44b and 44c each connected between a different associated one of the transformer output terminals 40a, 40b and 40c, respectively, and the main power terminal 12. The first rectifier 42 further includes negatively poled diodes 46a, 46b and 46c each connected between a different associated one of the transformer output terminals 40a, 40b and 40c, respectively, and system ground 14. In operation, the first rectifier 42 is effective to rectify the stepped-down three-phase AC voltage put out by the transformer 34 to provide a first full-wave rectified DC voltage between the main power terminal 12 and system ground 14, provided that the rectifier 42 is appropriately forward biased or enabled.

A second three-phase full-wave bridge rectifier 48 includes positively poled diodes 50a, 50b and 50c each connected between a different associated one of the generator output terminals 32a, 32b and 32c, respectively, and an auxiliary power terminal 52. The second rectifier 48 further includes negatively poled diodes 54a, 54b and 54c each connected between a different associated one of the generator output terminals 32a, 32b and 32c, respectively, and system ground 14. In operation, the second rectifier 48 is effective to rectify the three-phase AC voltage put out by the generator 20 to provide a second full-wave rectified DC voltage between the auxiliary power terminal 52 and system ground 14.

A voltage regulator 56 is responsive to the DC voltage appearing between the main power terminal 12 and system ground 14 to control the amount of current fed through the generator field winding 24 to cause the amplitude of the three-phase AC voltage developed across the generator output windings 22a, 22b and 22c to be correct to establish and maintain such DC voltage at the predetermined low magnitude, e.g., a nominal 14 volts. For this purpose, the voltage regulator 56 may, for example, be of the type shown in U.S. Pat. No. 3,098,964 or in U.S. patent application No. 775,172.

A selector switch 58, operable between opened and closed states, is connected between the main power terminal 12 and the auxiliary power terminal 52. When the switch 58 is closed, the main and auxiliary power terminals 12 and 52 are connected together. In this condition, the full-wave rectified DC voltage provided by the second rectifier 48 is applied through the switch 58 between the main power terminal 12 and system ground 14. The voltage regulator 56 is responsive to this DC voltage to control the amount of current fed through the generator field winding 24 such that the three-phase AC voltage developed across the generator output windings 22a, 22b and 22c is at a first amplitude correct when rectified by the second rectifier 48 to establish and maintain the DC voltage between the main power terminal 12 and system ground 14 at the predetermined low magnitude, e.g., a nominal 14 volts. Due to the voltage step-down action of the transformer 34, the positively poled diodes 44a, 44b and 44c of the first rectifier 42 are reverse biased, and so, the first rectifier 42 is disabled.

When the switch 58 is opened, the main and auxiliary power terminals 12 and 52 are disconnected from each other. In this condition, the positively poled diodes 44a, 44b and 44c of the first rectifier 42 are forward biased and the first rectifier 42 is enabled to provide a full-wave rectified DC voltage between the main power terminal 12 and system ground 14. The voltage regulator 56 is responsive to this DC voltage to increase the amount of current fed through the generator field winding 24 such that the three-phase AC voltage developed across the generator output windings 22a, 22b and 22c is at a second greater amplitude correct when stepped-down by the transformer 34 and rectified by the first rectifier 42 to establish and maintain the DC voltage between the main power terminal 12 and system ground 14 at the predetermined low magnitude.

Further, when the switch 58 is opened, the full-wave rectified DC voltage provided by the second rectifier 48 is applied between the auxiliary power terminal 52 and system ground 14. With the three-phase AC voltage put out by the generator 20 at the second greater amplitude, the DC voltage appearing between the auxiliary power terminal 52 and system ground 14 is at a predetermined high magnitude which is greater than the predetermined low magnitude of the DC voltage appearing between the main power terminal 12 and system ground 14. Specifically, the high-magnitude DC voltage is greater than the low-magnitude DC voltage by a voltage step-up ratio which is the converse of the voltage step-down ratio of the transformer 34. For example, if the voltage step-down ratio of the transformer is 4:1, then the high-magnitude DC voltage will be approximately four times greater than the low-magnitude DC voltage, i.e., for a low-magnitude DC voltage of 14 volts, the high-magnitude DC voltage would be approximately 56 volts. The latter high-magnitude DC voltage may be utilized to energize a high DC voltage accessory load 60 such as a high-power windshield heater.

Figure 2:
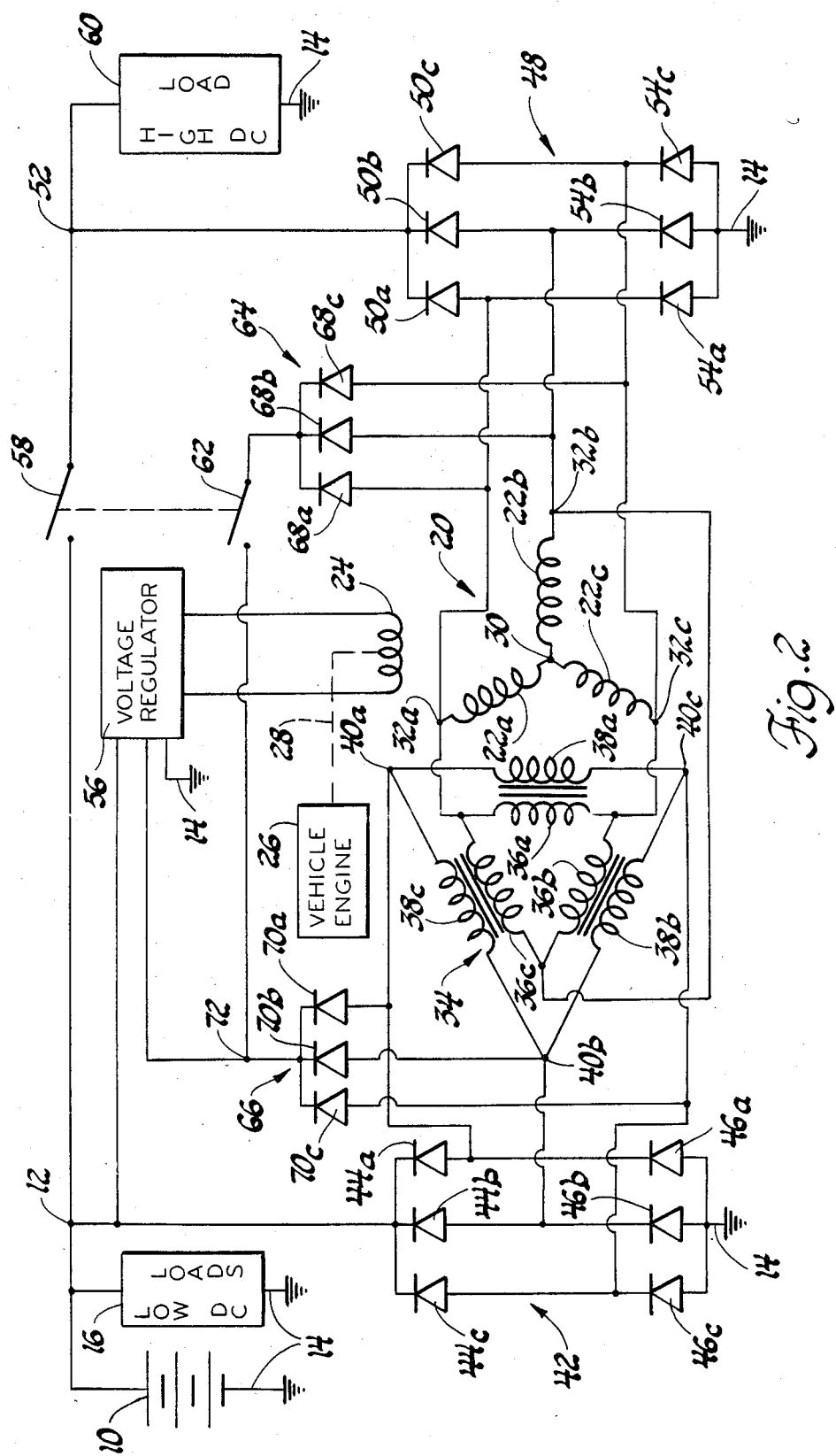
FIG. 2 is a schematic diagram of a further embodiment of the invention.

FIG. 2 illustrates a further embodiment of the invention applicable where the voltage regulator 56 is of the type in which the DC voltage for supplying the field winding 24 of the generator 20 is derived from a separate rectifier. Examples of this type of voltage regulator are disclosed in U.S. Pat. Nos. 3,469,168 and 3,539,864. Like numerals are used to denote like elements in FIGS. 1 and 2.

In addition to the elements shown in FIG. 1, FIG. 2 includes a second switch 62, and third and fourth three-phase half-wave rectifiers 64 and 66, respectively. The second switch 62 is operated in unison with the selector switch 58. The third rectifier 64 includes positively poled diodes 68a, 68b and 68c each connected from a different associated one of the generator output terminals 32a, 32b and 32c, respectively, through the second switch 62 to a field winding supply terminal 72 associated with the voltage regulator 56. The fourth rectifier 66 includes positively poled diodes 70a, 70b and 70c each connected from a different associated one of the transformer output terminals 40a, 40b and 40c, respectively, to the field winding supply terminal 72.

In operation, when the switches 58 and 62 are closed, the third rectifier 64 is effective to rectify the three-phase AC voltage produced at the generator output terminals 32a, 32b and 32c to provide a DC voltage of approximately the predetermined low magnitude for energizing the field winding 24 (with a current determined by the voltage regulator 56). Further, with the switch 62 closed, the fourth rectifier 66 is reverse biased or disabled. Alternatively, when the switches 58 and 62 are opened, the third rectifier 64 is disabled and the fourth rectifier 66 is enabled. In this condition, the fourth rectifier 66 is effective to rectify the stepped-down three-phase AC voltage produced at the transformer output terminals 40a, 40b and 40c to provide a DC voltage of approximately the predetermined low magnitude for energizing the field winding 24 (with a current determined by the voltage regulator 56). In this manner, the field winding 24 is always energized by a DC voltage of approximately the predetermined low magnitude regardless of the state of the selector switch 58 and the amplitude of the three-phase AC voltage put out by the generator 20.

It is to be noted that the foregoing embodiments of the invention are disclosed for purposes of illustration only and are not intended to limit the invention in any way. As will be appreciated by those skilled in the art, various alterations and modifications to the illustrated embodiments may be made without departing from the spirit and scope of the invention.

The embodiments of the invention in which an exclusive property or privilege is claimed are defined as follows:

1. A dual voltage electrical system for a motor vehicle, comprising:
   a storage battery connected between a main power terminal and system ground for providing standby power therebetween at a DC voltage of predetermined low magnitude;
   various DC voltage loads connected between the main power terminal and system ground for energization by the DC voltage appearing therebetween;
   a three-phase AC generator mechanically driven by the vehicle motor and having output windings and a field winding for producing a three-phase AC voltage across the output windings having an amplitude determined by the amount of current fed through the field winding;
   a three-phase transformer connected to the output windings of the generator for stepping down the amplitude of the three-phase AC voltage in accordance with a predetermined voltage step-down ratio;
   a first three-phase full-wave rectifier connected to the transformer for rectifying the stepped-down three-phase AC voltage put out by the transformer to provide a first full-wave rectified DC voltage between the main power terminal and system ground when the same is enabled;
   a second three-phase full-wave rectifier connected to the output windings of the generator for rectifying the three-phase AC voltage to provide a second full-wave rectified DC voltage between an auxiliary power terminal and system ground;
   a voltage regulator responsive to the DC voltage appearing between the main power terminal and system ground to control the amount of current fed through the field winding of the generator to cause the amplitude of the three-phase AC voltage produced by the generator to be correct to establish and maintain such DC voltage at the predetermined low magnitude; and
   a selector switch connected between the auxiliary power terminal and the main power terminal and operable between opened and closed states such that when the switch is in the closed state the first rectifier is disabled and the three-phase AC voltage put out by the generator is at a first amplitude correct when rectified by the second rectifier to establish and maintain the DC voltage between the main power terminal and system ground at the predetermined low magnitude, and such that when the switch is in the opened state the first rectifier is enabled and the three-phase AC voltage put out by the generator is at a second higher amplitude correct when stepped down by the transformer and rectified by the first rectifier to establish and maintain the DC voltage between the main power terminal and system ground at the predetermined low magnitude and further correct when rectified by the second rectifier to establish and maintain the DC voltage between the auxiliary power terminal and system ground at a predetermined high magnitude greater than the predetermined low magnitude by a voltage step-up ratio which is the converse of the voltage step-down ratio of the transformer thereby to provide a high-magnitude DC voltage capable of energizing a high DC voltage load connected between the auxiliary power terminal and system ground.

2. In a motor vehicle electrical system including a storage battery for providing standby power at a predetermined low magnitude between a main power terminal and system ground, an engine driven generator including output windings across which a three-phase AC voltage is produced at an amplitude determined by the amount of current fed through a field winding, a first rectifier for rectifying the three-phase AC voltage to provide a DC voltage between the main power terminal and system ground for charging the battery and for supplying other low-magnitude DC voltage loads in the vehicle, and a voltage regulator responsive to the DC voltage appearing between the main power terminal and system ground to control the amount of current fed through the field winding of the generator to cause the three-phase AC voltage developed across the output windings of the generator to have an amplitude correct to establish and maintain the DC voltage at the predetermined low magnitude; the improvement comprising:
   a three-phase transformer connected between the output windings of the generator and the first rectifier for stepping down the amplitude of the three-phase AC voltage in accordance with a predetermined voltage step-down ratio;

a second rectifier connected to the output windings of the generator for rectifying the three-phase AC voltage to provide a DC voltage between an auxiliary power terminal and system ground; and a selector switch connected between the auxiliary power terminal and the main power terminal and operable between opened and closed states such that when the switch is in the closed state the first rectifier is reverse biased and the three-phase AC voltage put out by the generator is at a first amplitude correct when rectified by the second rectifier to establish and maintain the DC voltage between the main power terminal and system ground at the predetermined low magnitude, and such that when the switch is in the opened state the first rectifier is forward biased and the three-phase AC voltage put out by the generator is at a second higher amplitude correct when stepped down by the transformer and rectified by the first rectifier to establish and maintain the DC voltage between the main power terminal and system ground at the predetermined low magnitude and further correct when rectified by the second rectifier to establish and maintain the DC voltage between the auxiliary power terminal and system ground at a predetermined high magnitude greater than the predetermined low magnitude by a voltage step-up ratio which is the converse of the voltage step-down ratio of the transformer thereby to provide a high-magnitude DC voltage capable of energizing a high DC voltage load connected between the auxiliary power terminal and system ground.

3. The motor vehicle electrical system of claims 1 and 2 further comprising:

means including a third rectifier for rectifying the three-phase AC voltage put out by the generator to provide a DC voltage of approximately the predetermined low magnitude for energizing the field winding of the generator as controlled by the voltage regulator when the selector switch is in the closed state; and means including a fourth rectifier for rectifying the stepped-down three-phase AC voltage put out by the transformer to provide a DC voltage of approximately the predetermined low magnitude for energizing the field winding of the generator as controlled by the voltage regulator when the selector switch is in the opened state;

whereby the field winding of the generator is energized by a DC voltage of approximately the predetermined low magnitude regardless of the state of the selector switch and the amplitude of the three-phase AC voltage put out by the generator.

4. The motor vehicle electrical system of claims 1 and 2 further comprising:

a second switch operable between opened and closed states in unison with the selector switch;

a third rectifier connected between the output windings of the three-phase generator and a field winding supply terminal of the voltage regulator through the second switch for rectifying the three-phase AC voltage produced by the generator output windings to provide a DC voltage of approximately the predetermined low magnitude for energizing the field winding when the second switch is in the closed state; and a fourth rectifier connected between the output of the three-phase transformer and the field winding supply terminal of the voltage regulator for rectifying the stepped-down three-phase AC voltage produced by the transformer to provide a DC voltage of approximately the predetermined low magnitude for energizing the field winding when the second switch is in the opened state;

whereby the generator field winding is energized by a DC voltage of approximately the predetermined low magnitude regardless of the state of the selector switch and the amplitude of the three-phase AC voltage produced by the generator output windings.

* * * * *